(12) United States Patent
House

(10) Patent No.: US 11,892,751 B2
(45) Date of Patent: Feb. 6, 2024

(54) SYSTEM AND METHOD FOR PRODUCT PHOTOGRAPHY

(71) Applicant: Robert House, Las Vegas, NV (US)

(72) Inventor: Robert House, Las Vegas, NV (US)

( * ) Notice: Subject to any disclaimer, the term of this patent is extended or adjusted under 35 U.S.C. 154(b) by 84 days.

(21) Appl. No.: 17/478,862

(22) Filed: Sep. 17, 2021

(65) Prior Publication Data

US 2022/0091480 A1    Mar. 24, 2022

Related U.S. Application Data

(60) Provisional application No. 63/080,326, filed on Sep. 18, 2020.

(51) Int. Cl.
| | |
|---|---|
| *G03B 15/06* | (2021.01) |
| *G03B 15/10* | (2021.01) |
| *G03B 15/05* | (2021.01) |

(52) U.S. Cl.
CPC ............ *G03B 15/06* (2013.01); *G03B 15/05* (2013.01); *G03B 15/10* (2013.01)

(58) Field of Classification Search
CPC ........ G03B 15/06; G03B 15/07; G03B 15/10; G03B 41/00; G03B 33/06; H04N 5/2356; H04N 5/2256; H04N 5/2224; H04N 5/2621
USPC ............................................... 396/20, 1, 3, 4
See application file for complete search history.

(56) References Cited

U.S. PATENT DOCUMENTS

| | | |
|---|---|---|
| 2,580,422 A | 1/1952 | Gunn |
| 3,039,357 A | 6/1962 | Eagle |
| 4,310,232 A | 1/1982 | Reed |
| 2,275,270 A | 10/1985 | Anthony |
| 4,796,990 A | 1/1989 | Crothers et al. |
| 7,164,462 B2 | 1/2007 | Lamarre |
| 7,931,380 B2 | 4/2011 | Williams et al. |
| 8,462,206 B1 | 6/2013 | McGuire et al. |
| 9,046,740 B1 | 6/2015 | Smithweck |
| 9,800,797 B2 | 10/2017 | Shioya |

(Continued)

FOREIGN PATENT DOCUMENTS

| | | | |
|---|---|---|---|
| CA | 2228403 A1 * | 8/1999 | ............ G02B 27/01 |
| CN | 2055947 | 4/1990 | |
| CN | 209356828 | 9/2019 | |

(Continued)

*Primary Examiner* — Christopher E Mahoney
(74) *Attorney, Agent, or Firm* — The Thornton Firm, LLC

(57) ABSTRACT

A system and method for product photography includes a movable display configured to travel along a path wherein the movable display provides illumination onto a photographic subject visible to at least one camera configured for long exposure photography where the movable display creates one or more digital light paintings at least partially visible to the camera, and a mechanical means for movement of the movable display. The invention employs a method of capturing a photographic image of an object including the steps of selecting an image for the movable display, using at least one camera to capture long exposure images, positioning one or more photographic subjects, positioning one or more cameras, focusing the one or more cameras, beginning capture of a long exposure, using a movable display to create a digital light painting effect, ending capture of the long exposure, and storing the image in memory.

29 Claims, 9 Drawing Sheets

(56) References Cited

U.S. PATENT DOCUMENTS 11,079,662 B2 * 8/2021 Allen .................. G03B 17/561
2014/0126835 A1 * 5/2014 Shioya .................. H04N 23/72
382/274

FOREIGN PATENT DOCUMENTS

| CN | 110632807 | | 12/2019 |
| CN | 111258169 A | * | 6/2020 |
| GB | 2573059 | | 10/2019 |
| WO | WO-2022192637 A1 | * | 9/2022 |

* cited by examiner

SYSTEM AND METHOD FOR PRODUCT PHOTOGRAPHY

CROSS-REFERENCE TO RELATED APPLICATIONS

The present utility patent application claims priority benefit of the U.S. provisional application for patent Ser. No. 63/080,326 titled "METHOD AND APPARATUS FOR PHOTOGRAPHY LIGHTING" filed on Sep. 18, 2020 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

1. Field of the Invention

The invention relates generally to the field of product photography. More specifically, the present invention relates to a system and method of capturing photographic images of photographic subjects using long exposure techniques in conjunction with an illuminated, moving display.

2. Description of the Related Art

Product photography is a commercial application of still-life photography that aims to present products in the best and most inviting ways possible. Today's product photography requires skilled photographers to apply their training, experience, equipment, and creative judgment to produce images that are appealing to consumers. Still-life photography is a genre of photography catering to the depiction of inanimate subject matter.

Photography is a multi-billion-dollar industry in the United States and beyond. In today's ecommerce-driven world, product photography is essential for providing the consuming public with digital images that are engaging, where the products stand out, and are ultimately capable of convincing customers to buy the products.

Photographic studios specializing in product photography dedicate themselves to providing high quality photographic images for ecommerce applications, internet applications, printed catalogs, product packaging, television applications, and printed materials. Such studios encounter a number of technical and business challenges during the course of capturing and processing images. Among these challenges are the configuration of professional lighting equipment, providing photographic surfaces and backgrounds, and the large amount of time, space, and training that is required to effectively utilize professional studio equipment. Other challenges involve obtaining precise control over the size, shape, intensity, color, and overall character of the light used to illuminate a photographic subject.

One particular challenge in the product photography industry involves capturing consistent and reproducible images from project to project. On any given day, a photographic studio may be capturing images of products ranging from athletic shoes to perfume bottles to sunglasses, each requiring their own unique lighting arrangements. Precisely re-creating a lighting arrangement from a photo shoot which may have occurred many months in the past remains a challenge for product photography studios. Scalability and automation have been another challenge in the product photography industry. At present, the overwhelming majority of product photographs are created in studios employing professional photographers which require a substantial investment of time and money to train, especially because a classically trained photographer will often require extensive additional training related to the field of product photography before being able to consistently produce quality results. In addition to high labor costs, professional photographic studios require a wide variety of expensive and complex photographic equipment. Such capital requirements limit the possibility of producing high-volume, high-quality work product while also remaining low-cost.

Devices exist which attempt to reduce the equipment and experience required to achieve desirable results with still-life photography. Many of these devices employ a box, dome, or tent of some kind inside of which the item to be photographed is placed. Such devices are often referred to as "light boxes" or "white boxes." Such devices may include a built-in light source, such as LEDs or fluorescent tubes. Alternatively, a light source may be provided separately, such as with a translucent white fabric tent where the lights are directed onto the tent from the outside. Though such devices can reduce the amount of space and equipment needed for still-life photography, such devices also limit the creative possibilities and overall image quality as many of these devices make use of white light coming from all directions, which often results in a flat, washed-out, or unappealing appearance to the resulting photos.

Certain devices exist to create special lighting effects, commonly referred to as "light painting." These devices typically use handheld, often colorful, lights which are moved about a photographic subject or scene in a generally dark environment such that when captured by a camera using a sufficiently long exposure, the light source and its path are "painted" into the scene. When configured as a "wand" or "stick" with a row of many lights, some of these handheld devices have the ability to "paint" complex shapes, patterns, and images when moved along a path. Through the use of a timed delay or an accelerometer, the lights can illuminate at appropriate times to create the appearance of an image or pattern floating in space when captured by a camera configured for long exposure photography, commonly referred to as "light painting." These light painting "wands" or "sticks" are handheld, with no such device mounted to a support structure and none utilizing a motorized conveyance. In addition to being handheld, existing devices are low resolution, with a large pixel pitch compared to what is available with modern display technology. Being low resolution, the large pixel pitch of these devices not only results in a low-resolution light painting, but also results in visible streaks in the digital light painting from the gaps between each pixel. Because of the lack of a precise means for moving the device through three-dimensional space, such devices cannot precisely align a pattern of lights to a fixed point so as to create a stable, high-quality, high-definition, repeatable light painting.

If it were possible to precisely coordinate the motion of a movable display with the image shown on the display, a photographer could "paint" entire studio lighting arrangements, by creating a digital light painting which includes the appearance of lighting equipment such as scrims, softboxes, umbrellas, backgrounds both scenic and solid, flags, bounces, complex shapes, and more without the need for that equipment to be physically present, nor would the time or experience required to configure those traditional studio lighting elements be necessary. Furthermore, these artificial studio lighting arrangements could be saved and recalled for future use, enabling precise repeatability of a lighting arrangement.

At present, no such invention exists which utilizes a high-resolution movable display connected to a motorized conveyance that enables precise lighting, through the use of digital light painting techniques, onto, around, and/or behind a product. Such an invention would allow individuals with little training to produce high quality, repeatable, product photographs quickly and with far less equipment than a traditional photography studio, thus enabling scalability with high quality and high volume at reduced cost. Based on the foregoing, there clearly exists a need for such an improved system and method for product photography.

SUMMARY

The present invention fulfils the need for an improved system and method for product photography. The invention in its current form precisely synchronizes a high-resolution illuminated digital display moving in a three-dimensional space with an image shown on the digital display such that the image remains in a stationary position relative to the movement path of the digital display. When photographed by a camera using a sufficiently long exposure, any light emitted by the digital display visible to the camera while the digital display moves along its travel path will be recorded by the camera, and any synchronized image shown on the digital display will appear stationary and without significant motion blur when photographed by the camera. The resulting effect is referred to within this patent application as "digital light painting."

At its essence, the present invention employs a novel method of capturing a photographic image of an object including the steps of selecting an image to be used in the creation of a digital light painting, configuring one or more cameras to capture long exposure images of one or more photographic subjects, placing one or more photographic subjects onto a surface configured for placing one or more photographic subjects to be photographed, positioning one or more cameras configured to capture long exposure images of one or more photographic subjects such that the said one or more photographic subjects are within the field of view of one or more cameras, focusing the one or more cameras configured to capture long exposure images of one or more photographic subjects, beginning capture of a long exposure, using a movable display to provide illumination onto said one or more photographic subjects, moving or using the movable display as the movable display travels along a path to create one or more digital light paintings at least partially visible within the field of view of one or more cameras, ending capture of the long exposure, and storing the photographic image in memory.

As a novel apparatus, the invention includes a movable display, the movable display being configured to travel along a path wherein the said movable display provides illumination onto at least one photographic subject visible within the field of view of at least one camera configured for long exposure photography; the movable display, as said movable display travels along said path, creates one or more digital light paintings at least partially visible to at least one camera configured for long exposure photography; and a mechanical means for movement of the said movable display. In embodiments of the invention, a flat rectangular shaped color display having a display area sufficiently large enough so as to encompass the vertical field of view of at least one camera configured for long exposure photography is used. In other embodiments of the invention, a curved, rectangular shaped color display can be used. The curved display could be either vertical or horizontal depending on the particular use.

Embodiments of the invention include a rotatable surface on which one or more photographic subjects are placed. Such a rotatable surface is supported at the outer edges by a frame assembly including two or more curved arms attached to a frame. Supporting the rotatable surface by the outer edges permits the use of a transparent or near transparent rotatable surface, allowing a camera to see through the rotatable surface without the support structure underneath being visible. The curved arms include a plurality of rollers configured to support a rotatable surface on which one or more photographic subjects are placed. In one embodiment, the rollers feature a flange used to keep the rotatable surface in place. In other embodiments of the invention, the rotatable surface can be supported by an axle assembly, a simpler design which can be used when a translucent rotatable surface is not needed. The rotatable surface is driven by at least one motor configured to rotate the rotatable surface clockwise or counterclockwise incrementally. Such a rotatable surface allows for product photography at multiple angles without having to move the photographic subject itself. In other embodiments of the invention, the surface on which one or more photographic subjects are placed does not rotate.

Embodiments of the invention precisely synchronize an illuminated digital display moving in three-dimensional space with an image shown on the digital display such that the image remains in a stationary position relative to the movement path of the digital display. This synchronization allows for the creation of high-definition digital light paintings. When photographed by a camera using a sufficiently long exposure, any light emitted by the digital display visible to the camera while the digital display moves along its travel path will be recorded by the camera, and any synchronized image shown on the digital display will appear clear and stationary to the camera. Such an effect is unique in product photography.

In one embodiment of the invention, the digital display travels in a circular or rotational or orbital trajectory around an axis and a central point shared by a photographic subject. When used in long exposure photography, the movable display is able to paint a digital light painting behind and around the photographic subject such that the subject may appear to be illuminated from all directions. Unique effects can be created by creating a digital light painting using the movable digital display in conjunction with long exposure photographic techniques, which may appear to include various light sources and high-definition backgrounds, even though no such arrangement physically exists.

Using the novel apparatus and the aforementioned method steps, a photographer can produce substantially enhanced digital photographs which can be used as standalone images. Additionally, a photographer can program and repeat desired images and lighting settings for a digital light painting effect. Furthermore, high quality, high-definition animations can be created by sequencing multiple images captured with the system and method for product photography. Put simply, the present invention offers quality, versatility, precise creative control, and reproducibility for product photography studios.

BRIEF DESCRIPTION OF THE DRAWINGS

The invention directed by way of example, and not by way of limitation, in the figures of the accompanying drawings and in which like reference numerals refer to similar elements and in which.

Figure 1:
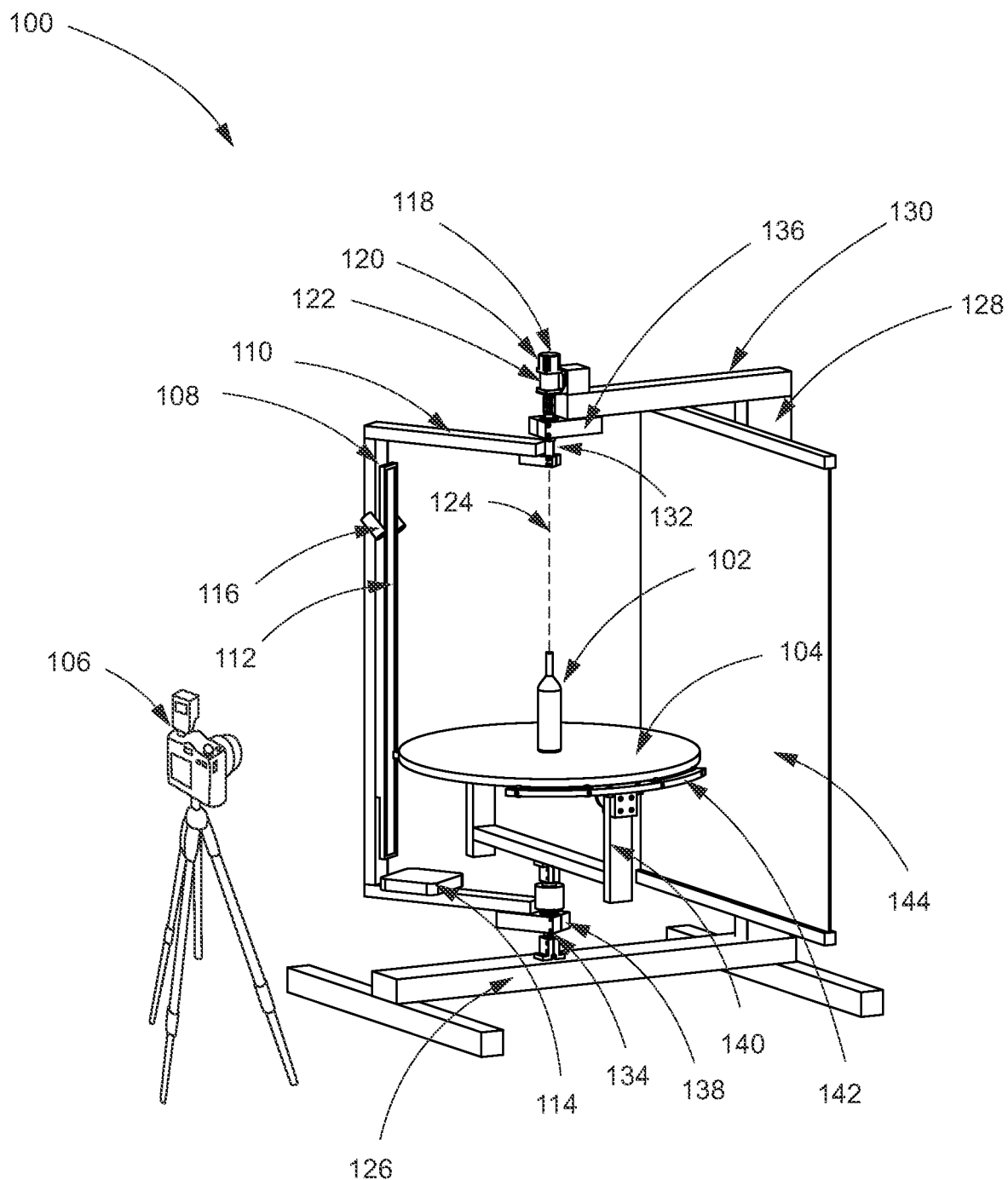
FIG. 1 is perspective view of the system for product photography in accordance with an embodiment of the invention.

Unless otherwise indicated illustrations in the figures are not necessarily drawn to scale.

DETAILED DESCRIPTION OF THE PREFERRED EMBODIMENTS

Terminology used herein is used for the purpose of describing particular embodiments only, and is not intended to limit the scope of the present invention. It must be understood that as used herein and in the appended claims, the singular forms "a," "an," and "the" include the plural reference unless the context clearly dictates otherwise. For example, a reference to "an element" is a reference to one or more elements and includes all equivalents known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Language that may be construed to express approximation should be so understood unless the context clearly dictates otherwise.

Unless defined otherwise, all technical and scientific terms used herein have the same meanings as commonly understood by a person of ordinary skill in the art to which this invention belongs. Preferred methods, techniques, devices, and materials are described. But any methods, techniques, devices, or materials similar or equivalent to those described herein may be used in the practice or testing of the present invention. Structures described herein should also be understood to refer to functional equivalents of such structures.

References to "one embodiment," "one variant," "an embodiment," "a variant," "various embodiments," "numerous variants," etc., may indicate that the embodiment(s) of the invention so described may include particular features, structures, or characteristics. However, not every embodiment or variant necessarily includes the particular features, structures, or characteristics. Further, repeated use of the phrase "in one embodiment," or "in an exemplary embodiment," or "a variant," or "another variant," do not necessarily refer to the same embodiment although they may. A description of an embodiment with several components in communication with each other does not imply that all such components are required. On the contrary, a variety of optional components are described to illustrate the wide variety of possible embodiments and/or variants of the present invention.

"Photographic effects" are phenomena which disrupt the basic relationship between the exposure of a photographic material such as film or an optical sensor and the natural transmission of light through a photographic medium such as a lens to the photographic material. Photographic effects can be produced through the use of differing lenses, differing film speeds, different lighting, and differing shooting techniques. Additionally, photographic effects can be created by adjusting camera functions such as aperture, shutter speed, focus, and exposure time. Whether the camera is an older film camera or one of today's top-of-the-line digital cameras, basic image effects such as, but not limited to, bokeh, panning, fill flash, and long exposure can create high-quality photographic images.

"Long-exposure photography," also known as time-exposure, or slow-shutter photography is a style of photography which uses a long-duration shutter speed or sensor exposure to capture images over a period of time. One effect of long exposure photography is that the paths of bright moving objects become visible. For example, vehicle lights leave trails as they travel down a road or highway, stars leave trails as they travel across the sky, and water waves appear smooth as they crash on a shoreline. Typical long exposure photographs are taken in low-light conditions where a camera's shutter or functional equivalent is kept open to allow sufficient light to capture a visible image.

"Light painting" is a photographic effect where handheld lights are used to "paint" a photographic effect while the shutter of a camera is left open during a long exposure photograph. Typical light painting involves moving a light source in a camera's field of view while the camera's shutter is open. By manually moving light sources such as flashlights, LEDs, glow sticks, and lit fireworks, a photographer can capture images of persons, objects or landscapes with spectacular effects "painted" into the image. Light painting requires a generally dark shooting environment in order to allow a camera to capture both the stationary and moving photographic subjects used to create a final image. Equipment used to capture high quality light painting images generally include a light source, a camera capable of taking long exposure photographs, a lens capable of photographing photographic subjects using long exposure techniques, a tripod or other means for keeping the camera stable when shooting, and a shutter release mechanism which allows for a stable image capture without touching the camera.

"Digital light painting" refers to a novel type of light painting where a digital display containing at least one column of independently controllable light sources is used to "paint" an image in three-dimensional space by moving the display across the field of view of a camera configured for long exposure photography while synchronizing the image shown on the display such that the image remains stationary relative to the motion of the display. The content shown on a digital light painting can vary widely depending on the application, varying from solid colors, to complex patterns, to photographic studio arrangements, to full color photographs, environments, and much more. The resolution of a digital light painting is affected by the properties of the digital display being used as well as the precision of the synchronization of the movement of the display with the image shown on the display. For example, a digital light painting created using a display with thousands of vertical pixels, moved by a conveyance with a high level of horizontal precision, would be higher resolution than a digital light painting created using a display with fewer vertical pixels, and a lower level of horizontal precision.

"Pixel pitch," also referred to as "dot pitch" refers to the pixel density of a display. Pixel pitch is typically measured as the distance between the centers of two pixels on a display, often represented as "pixels per millimeter" in higher resolution displays, or "millimeters per pixel," in lower resolution displays. A display with a lower pixel pitch will have a smaller distance between each pixel and therefore a higher pixel density, or higher resolution.

"Photographic subject" refers to a product or object being photographed.

A "stepper motor," also known as step motor or stepping motor, is an electric motor that divides a full rotation of its drive shaft into a number of equal steps. A typical stepper motor's drive shaft can be commanded to move one step at a time in either a clockwise, or counterclockwise direction by a stepper motor controller, which can either be integrated into the motor, or a separate device. When electrical current is applied to the stepper motor by the stepper motor controller, the stepper motor holds the drive shaft in its current position, limited by the torque rating of that particular stepper motor, until it is commanded to move by the stepper motor controller.

A "computer" may refer to one or more apparatus and/or one or more systems that are capable of accepting a structured input, processing the structured input according to prescribed rules, and producing results of the processing as output. Examples of a computer may include: a personal computer (PC); a stationary and/or portable computer; a computer having a single processor, a computer having multiple processors, or a computer having multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer; a personal digital assistant (PDA); a portable telephone; a portable smartphone; wearable devices such as smartwatches; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

The term "processor" may refer to any device or portion of a device that processes electronic data from registers and/or memory to transform that electronic data into other electronic data that may be stored in registers and/or memory. A "computing platform" may comprise one or more processors.

A "microcontroller" generally refers to a small computer on a single integrated circuit. A microcontroller contains one or more central processing units (processor cores) along with memory and programmable input/output peripherals. A typical microcontroller includes a processor, memory and input/output (I/O) peripherals on a single chip.

An "algorithm" is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

It will be readily understood by persons skilled in the art that the various methods and algorithms described herein may be implemented by appropriately programmed computers, microcontrollers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

"Software" may refer to prescribed rules and/or instructions used to operate a computer. Non-limiting examples of software may include: Code segments in one or more computer-readable languages; graphical and or/textual instructions; applets; pre-compiled code; interpreted code; compiled code; and computer programs. An operating system or "OS" is software that manages computer hardware and software resources and provides common services for computer programs.

Certain embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object-oriented programming languages and/or conventional procedural programming languages, and/or programming languages or other compilers, assemblers, interpreters or other computer languages or platforms.

A "computer system" may refer to a system having one or more computers, where each computer may include a computer-readable medium employing software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a plurality of computers and associated devices that may be connected by communication channels to facilitate communication and resource sharing. A network may involve permanent connections such as cables or temporary connections such as those made through telephone, cable, wireless or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include, but are not limited to, an internet, such as the Internet or World Wide Web; an intranet; a personal area network (PAN); near field communication (NFC); a local area network (LAN); a wide area network (WAN); a virtual private network (VPN); internet of things (IoT); and a combination of networks, such as an internet and an intranet.

Aspects of the exemplary system and method for product photography will be described below with reference to flowchart illustrations and/or block diagrams of methods, steps, apparatus (systems) and computer program products according to embodiments of the invention. Persons skilled in the art will understand that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, microcontroller, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the exemplary system and method for product photography. It will become readily apparent to persons skilled in the art that each block in the flowchart or block diagrams may represent a module, segment, or portion of code, which comprises one or more executable instructions for implementing the specified logical function(s). It will also be readily apparent to persons skilled in the art that in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any practical order.

It will also be understood by persons skilled in the art that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

It will be readily understood by persons skilled in the art that the various methods and algorithms described herein may be implemented by appropriately programmed computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

As is well known to those skilled in the art, many careful considerations and compromises typically must be made when designing the optimal manufacture or commercial implementation of such a system and method for product photography. A commercial implementation in accordance with the spirit and teachings of the invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art.

The exemplary system and method for product photography will now be described in detail with reference to embodiments thereof as illustrated in the accompanying drawings. Unless otherwise indicated illustrations in the figures are not necessarily drawn to scale.

FIG. 1 is a perspective view of the system for product photography 100 in accordance with an embodiment of the invention. In this view, a photographic subject or product 102 is placed on a rotatable surface 104 on which one or more photographic subjects or products 102 are placed. A camera 106 is configured to capture long exposure images of one or more photographic subjects. In the preferred embodiment of the invention, a rotating arm assembly includes a movable display 108 supported by a movable arm 110 that is configured to rotate around the photographic subject or product. The movable display 108 includes a screen 112 configured to emit light of any color and any pattern, and is configured to receive a display output signal from one or more computers 114. The display 108 with the screen 112 is commonly referred to as the movable display 108. In embodiments of the invention, the movable display 108 contains at least two vertical columns of pixels, the vertical columns capable of encompassing the vertical field of view of a camera. In one embodiment of the invention, the screen 112 is roughly 2 inches wide and 47 inches tall with a resolution of 160 pixels wide by 3840 pixels tall. In other embodiments of the invention, the width and height of the screen 112 can vary. In other embodiments of the invention, more than one movable display 108 can be used. The movable display 108 may be any type of display such as, but not limited to, LED, OLED, Plasma, LCD or DLP. The screen 112 in each movable display 108 can be flat or can be curved.

One or more additional accessory lights 116 may be mounted to the movable arm 110. The accessory lights 116 may be any type of light and of any temperature or intensity, including variable color or temperature. The one or more accessory lights 116 may be controlled by the one or more computers 114 to adjust and control factors such as, but not limited to, color, temperature, intensity and light output.

For a mechanical means for movement of the movable display, a motor assembly including a motor controller 118, a motor 120 and a gearbox assembly 122 governs the motion of the movable arm 110 and the movable display 108. Stated differently, the mechanical means for movement of the movable display is configured in such a way so as to revolve the movable display 108 around a central axis 124. In the preferred embodiment of the invention, the arm is rotatable about a central axis 124 and driven by a stepper motor 120 mated to a planetary gearbox and controlled by a stepper motor controller 118. The motor controller 118 receives control instructions from one or more computers 114 to control factors such as the speed and position of the movable arm 110. By way of example, and not limitation, the movable arm can rotate about a central axis 124 at a fixed speed. Such a configuration allows for a mechanical means of precisely moving the movable display in controllable increments. It is contemplated that the mechanical means for movement of the movable display is a movable conveyor assembly, the said movable conveyor assembly configured to move the said movable display linearly or near linearly in a camera's field of view from one side of the said one or more photographic subjects, behind the said one or more photographic subjects, to the other side of the said one or more photographic subjects in such a manner so as to create a digital light painting when the said movable display is moved behind one or more photographic subjects. The movable conveyor can be any mechanical means such as, but not limited to an actuator system, a solenoid system, a hydraulic system, a pneumatic system, or an electromechanical system, which may travel along a track, or be a self-guided or autonomous vehicle.

Various embodiments of the invention include a frame configured to provide a stable platform onto which the rotating arm assembly, including a movable display 108 and a mechanical means for moving such a movable display, are mounted. In one embodiment of the invention, the frame is a metal tube design having an H shaped bottom frame 126 configured to provide a stable platform. Persons having skill in the art will appreciate that a bottom frame can be configured in numerous ways. The frame includes a vertical riser 128 and an upper support 130 which are also metal tubular and can be connected by numerous means known and appreciated in the art. Although shown with metal tubular design, persons having skill in the art will understand that any type of frame material and frame construction may be used to build a rigid or near rigid support structure that will provide a stable surface. In addition, although shown as a rotating arm, it is contemplated herein that the display 108 may move or rotate around the product in any manner such as, but not limited to, a track system located on the ground, or above the rotatable platform 104. Thus, the movable display 108 is not limited to being mounted to a rotating arm. Moreover, the movable display need not rotate in a perfect circle or orbit.

In some embodiments of the invention, the camera 106 can be configured as a separate instrument from the system. In an embodiment of the invention, the camera 106 configured for long exposure photography remains stationary while in use. In other embodiments, the camera 106 can be moved in varying manners. In one embodiment, the camera 106 is controlled by a microcontroller unit capable of governing the functions of the camera and allowing for storage of images captured by the camera 106. Persons having skill in the art will appreciate that aftermarket microcontroller units such as the Raspberry Pi® or Arduino® computer kits can be readily configured to control such a camera and store captured images. Such a computer can be networked with the computer system 114 which governs the functions of the system. Such networking allows for the transfer of images and data. In other embodiments, the camera 106 can be integrated into the invention by way of attaching to the frame with a movable camera support assembly capable of adjusting the position of the camera. In such a configuration, the position of the camera can be adjusted via motors and controlled by way of the computer 114.

In one embodiment of the invention, the means for moving the movable display 108 is a rotating arm assembly. In such an embodiment, the movable display 108 is affixed to a rotating movable arm 110 which is connected to the vertical riser 128 via an upper axle 132 and a lower axle 134 which permit the movable arm 108 to orbit around a central axis 124. In other embodiments, other means for connecting the arm to the frame may be utilized. For example, the arm may be connected to the frame via a single upper axle thus omitting the bottom axle altogether. Alternatively, the movable arm may be connected to the frame via a single lower axle. Such embodiments allow for a simpler design of the support structure 140 for the rotatable surface 104. However, two axles are used in the disclosed embodiment to provide additional strength and stability to the movable arm 110 and the attached movable display 108. The upper axle 132 receives radial motion from the stepper motor 120 and is allowed to rotate around the central axis 124. The upper axle 132 is stabilized by a plurality of bearings connected to an upper brace 136 which is affixed to the frame. Persons having skill in the art will understand that the term support structure and frame are used interchangeably herein. The lower axle 134 is affixed to the support structure via a lower brace 310. In one embodiment, the lower axle 134 shares the same central axis 124 as the upper axle 132 but the lower axle 134 does not rotate, it remains stationary. The movable arm 110 can be connected to the lower axle 134 via a plurality of bearings connected to a lower brace 138.

In one embodiment of the invention, the rotatable surface 104 is a round, clear tabletop measuring approximately 36 inches in diameter by 1 inch in thickness is placed upon two curved arms 142 which are affixed to the rotatable surface support structure 140. In one embodiment of the invention, the curved arms 142 include a raised lip, keeping the rotatable surface 104 in place. The rotatable surface support 140 is affixed to the lower axle 134 via a stanchion. In other embodiments, other methods and arrangements may be adopted for securing the rotatable surface 104 to the frame or rotatable surface support structure 140. It should be noted that the rotatable surface support 140 itself does not rotate.

A backdrop assembly 144 can be affixed to the frame or support structure. Such a backdrop assembly can be used to provide a uniform color background. A backdrop serves to absorb light, prevent undesired reflections, to prevent light interference, and to prevent the vertical riser 128 or other unwanted objects behind the apparatus from being visible in the captured image. Persons having skill in the art will appreciate that numerous materials, colors, and techniques may be used to create such a backdrop assembly. In one embodiment the backdrop is made of a black material with a matte finish. In other embodiments, the backdrop may be coated with a black, light-absorbing material. Persons having skill in the art will further understand that a dark room or space is generally required in order to produce high-quality long exposure images. Such dark room and backdrop features are useful for the production of high-quality images.

Persons having skill in the art will appreciate that the system disclosed herein may be scaled down in size for small product photography, such as small products or jewelry, or scaled up in size to photograph large photographic subjects such as cars, appliances, or large equipment and products. When scaled up in size, the movable display 108 may be on tracks (overhead or located on the ground) which form a circle or arc around all or a portion of the product. In other embodiments, the movable display can be configured to move linearly or near linearly in a camera's field of view from one side of one or more photographic subjects, behind the one or more photographic subjects, to the other side of the said one or more photographic subjects in such a manner so as to create a digital light painting when the said movable display is moved about and behind one or more photographic subjects.

Figure 2:
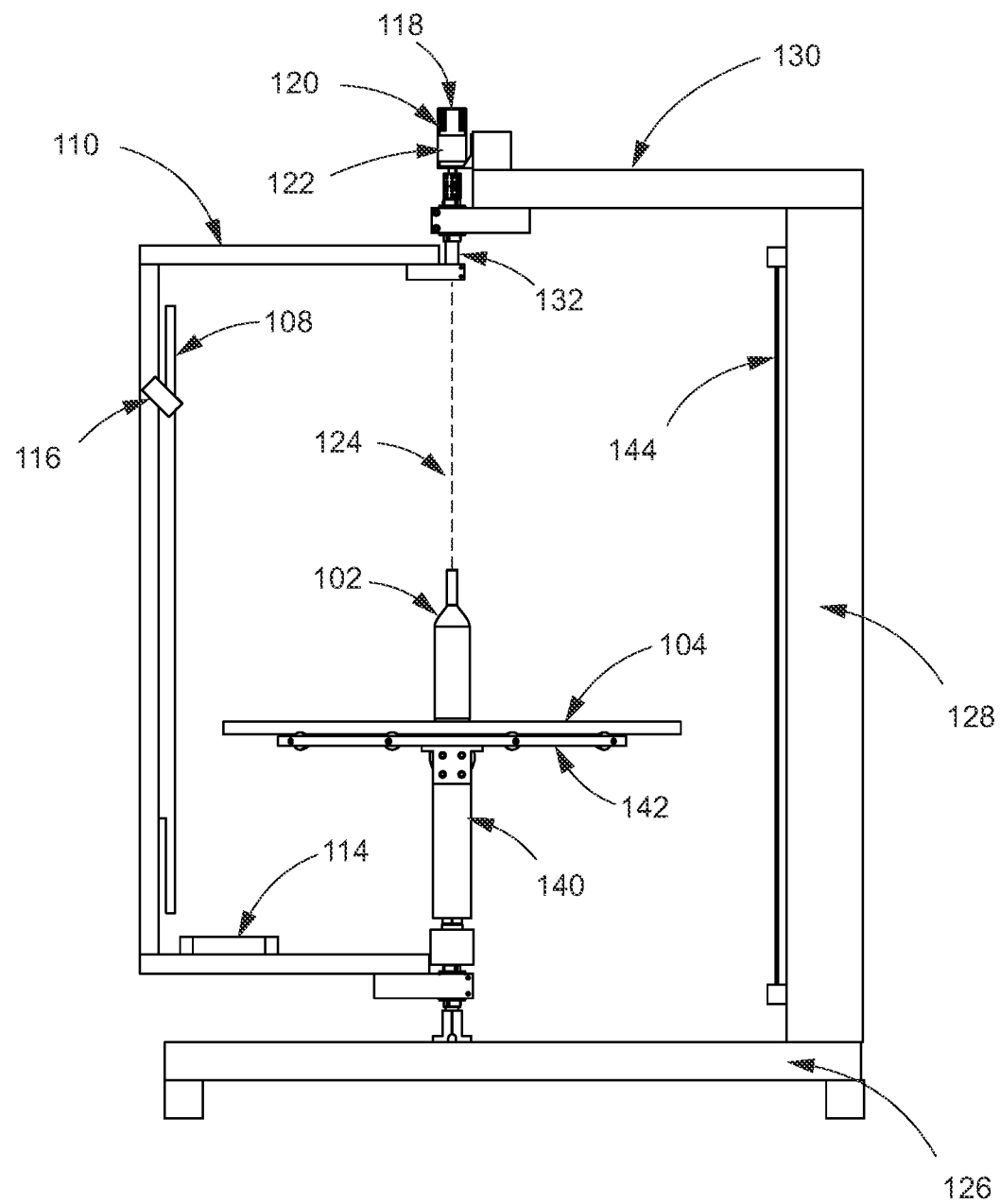
FIG. 2 is a side elevation view of the system for product photography in accordance with an embodiment of the invention.

FIG. 2 is a side elevation view of the system for product photography 100 in accordance with an embodiment of the invention. In this view, a photographic subject or product 102 is placed on a rotatable surface 104 on which one or more photographic subjects or products 102 are placed. In the preferred embodiment of the invention, a movable display 108 is supported by a movable arm 110 that is configured to rotate around the product. In one embodiment of the invention, the movable arm 110 has a metal tube construction having a C shaped or two right angle frame. Persons having skill in the art will appreciate that numerous movable arm assemblies can be created to move a movable display through three-dimensional space, and the embodiment as shown is but one of numerous combinations as contemplated within the scope of the invention.

In one embodiment of the invention, the rotatable surface 104 upon which photographic subjects are placed is made from a clear acrylic plastic material. Acrylic was chosen instead of glass for safety reasons as it is lighter in weight and less likely to shatter when laden with weight. In this embodiment, the rotatable surface 104 is one inch thick which reduces sagging when supporting a heavy photographic subject. While this embodiment utilizes a clear rotatable surface 104, other materials may be used to change the appearance of the surface on which the photographic subject (product) 102 rests. Examples of other suitable materials and finishes may include, but are not limited to translucent acrylic, opaque white acrylic, opaque black acrylic, wood, stone, metal, or any other suitable support surface or combination thereof.

The movable display 108 includes a screen 112 configured to emit light of any color and any pattern and is configured to receive a display output signal from one or more computers 114. In other embodiments of the invention, more than one movable display 108 can be used. As previously disclosed, the movable display 108 may be any type of display such as, but not limited to, LED, OLED, Plasma, LCD or DLP.

One or more accessory lights 116 are affixed to the sides of the digital display 108 or the movable arm 110 and arranged to direct light towards the product 102 at a downward angle of approximately 45 degrees. In other embodiments the accessory lights may be arranged at different locations on the movable arm 110, at different angles, or may be positioned on stands or other supports and in a fixed position. It is also contemplated that underlighting may be provided below the rotatable surface 104. The accessory lights 116 provide an additional source of light separate from what is provided by the movable display 108. When desired, this separate source of light can be controlled by the computer 114 to illuminate the one or more photographic subjects 102 from any point along the travel path of the movable arm 110. Through the computer 114 user interface, the user can specify at what points along the travel path of the arm 110 the accessory lights 116 should illuminate, as well as the duration, color, and intensity of illumination. In one embodiment, the accessory lights 116 are LED type lights with a color temperature of 5500 degrees kelvin, matching the native color temperature of the screen 112 of the movable display 108. In this embodiment, one light is a spotlight with a narrow beam and the other light is a flood light with a wider beam. Each can be controlled independently by the computer 114.

In embodiments of the invention, the means for rotating the rotating arm assembly can include at least one stepper motor 120 and a gear system which rotates the said rotating arm and the movable display around a central axis in a fixed number of steps at a fixed interval between each step. The movement of the motor 120, which may be a stepper motor having thousands of steps per 360 degrees of rotation when combined with the gearbox 122, is synchronized with the movable display 108. In an embodiment of the invention, the distance traveled by the movable display 108 with each step of the motor 120 is equal to the pixel pitch of the screen 112. Thus, instructions or software on the computer 114 sends an electrical impulse or signal to the motor 120 instructing it to move one step or increment. An image stored on the computer 114 can be a color pattern, a light pattern, or a high-definition image having a high pixel resolution. A user can select from numerous images, light patterns, and color patterns to be displayed. One segment of the said image, the said segment being at least two pixels in width, is displayed on the movable display 108. After waiting a specified number of milliseconds, the computer 114 will then shift the image displayed on the movable display 108 by one pixel opposite the direction of travel. The number of milliseconds that the arm stays at one position is selected to properly expose the photograph captured by the camera and may be related to the response rate of the display, or the ISO setting or light sensitivity of the camera. The computer 114 then continues this cycle until one complete rotation has been completed. In an exemplary embodiment of the invention, the number of steps is 10,000 steps per 360 degrees of rotation. The long exposure sequence ends with the shutter of the camera 106 closed or other functional equivalent, thus completing the picture capture sequence. As a result, during the long exposure picture capture by the camera 106, the photographic subject is surrounded by the light of the digital light painting created by the movable display as it travels around the photographic subject. It must be understood, though, that a rotating arm assembly is only one such mechanical means of precision movement of a movable display The image shown on the screen 112 of the digital display 108 moves with each step of the stepper motor 120. Thus, as the screen 112 moves one step, the image displayed on the screen moves one step (typically one pixel) in the opposite direction. In effect, this causes the image on the screen to remain stationary in three-dimensional space because with each step of the stepper motor 120, and thereby the movable arm 110 and screen 112, the image shown on the movable display 108 is moved opposite the direction of travel by an equal distance through the software in the computer 114. In the exemplary embodiment, the distance traveled by the screen 112 with each step of the stepper motor 120 is equal to the pixel pitch of the active display area. In other embodiments, the movement of the arm and screen may advance, with each step of the stepper motor 120, a distance other than the pixel pitch (pixel size). It is advantageous for the distance travelled by the screen 112 with each step of the stepper motor 120 to be equal to the pixel pitch of the display because this allows for a 1:1 relationship between both pixel pitch and distance travelled. This allows for the sharpest possible image with no interpolation and reduced software complexity. In one embodiment, the movable display 108 features an LCD screen 112 with a pixel pitch of 3.21 pixels per millimeter. In this embodiment, a stepper motor 120 with a native resolution of 200 steps per revolution is mated to a planetary gearbox 122 with a gear ratio of 50:1, resulting in a final output shaft resolution of 10,000 steps per revolution. 10,000 steps divided by 3.21 pixels per millimeter results in 3115.264 millimeters of total travel distance the screen must transit per revolution of the stepper motor output shaft in order to achieve a 1:1 relationship between the pixel pitch of the screen 112 and the distance the screen travels with each step of the stepper motor. Dividing 3115.264 millimeters by pi results in a circle with a diameter of 991.619 millimeters, or roughly 39 inches. Therefore, the display 108 is mounted on the arm 110 such that the screen 112 is placed at a distance approximately 495.81 millimeters radially from the central axis 124, thus achieving a 1:1 relationship between the pixel pitch of the screen 112 and the distance said screen travels with each step of the stepper motor 120. Persons having skill in the art will appreciate that the maximum vertical resolution of the digital light painting is limited to the vertical resolution of the screen 112 and the horizontal resolution of the digital light painting is limited to the total number of steps in the travel path of the movable display 108. In one embodiment of the invention the vertical resolution of the display 108 is 3840 pixels and the total number of steps in the travel path of the movable display is 10,000 steps, therefore the overall dimensions of the digital light painting has a maximum resolution of 3840 pixels tall by 10,000 pixels wide.

In embodiments of the invention, the pixel pitch of the movable display is sufficiently small such that the space between each pixel of said movable display is not resolvable by a camera configured for long exposure photography when said camera configured for long exposure photography is focused on one or more photographic subjects. The resultant image will appear to have a flawless light painting effect, with no "gaps" between the pixels. Such horizontal resolution of the digital light painting is equal to the pixel pitch of the movable display.

It is to be understood by persons having skill in the art that the image file shown on the movable display 108 will be stored on the computer 114 that represents the image to be produced through digital light painting as the movable display is moved, in steps, around the photographic subject or product 102. In various embodiments, the computer has at least one processor and memory including computer readable instructions which, when executed by the at least one processor, cause the movable display 108 to display to display a segment of a stored image which is synchronized with the position of the movable display in such a manner that when the movable display travels one increment in one direction, the stored image displayed on the movable display is moved one increment in the opposite direction in such a manner that the resultant digital light painting image appears stationary. The image may be considered a rectangular image. The height of the image represented by the image file may be equal to or related to the number of pixels on the display in the vertical direction. The width of the image may be equal to or based on the circumference of the circle or arc traveled by the screen or the distance traveled by the screen and the pixel pitch. Portions of the image may be output as basic white light to front light the front of the product when the screen is facing the product (facing the front side of the product). In addition, due to the extremely controllable aspect of the screen, light other than white light may be output from the screen. It is to be further understood that the computer 114 having at least one processor and memory include computer executable instructions which, when executed by the said at least one processor, adjust the properties of the image displayed on the movable display such as, but not limited to, brightness, contrast, hue, and saturation.

By way of example, and not limitation, the screen 112 may display colored light, a simple or complex pattern, or an image to reflect off of the product toward the camera, or to be used as a background. An example of a simple pattern would be having the top of the screen dimly lit while the bottom half is brightly lit which would result in the top portion of the product being dimly lit while the bottom portion of the product is more brightly lit. In one embodiment, the background image may also be presented to the front of the product to further immerse the product in the background image scene. By way of example, if the background environment in the image is a city's downtown, then the front of the product may reflect skyscrapers or cars while the image behind the product is a cityscape. Other portions of the image that are displayed when the screen 112 is facing the back side of the product may also be white, or any other color, to provide a solid color background area for the product image or an image may be shown the screen to create a background image in the area behind the product. Selection and configuration of the image to be displayed can be made manually by a user via a user interface or automatically via a software program. It is contemplated that a software program can recognize the type of photographic subject being photographed and automatically select from a number of possible appropriate images to create a digital light painting.

Persons having skill in the art will appreciate that select portions of the image, when displayed on the screen 112, may have greater or lesser brightness levels such that at different locations around the circle or arc traveled by the screen, the product will receive the differing levels of brightness. Such metrics can be governed by the one or more computer units 114. In the final image captured by the camera, this will highlight or make brighter certain areas of the product or reduced glare or 'blown-out' areas of the final image. This provides previously impossible control and precision over product lighting during image capture. In addition, the speed of motion of the arm can be used to create or modify the effect. A slower arm motion will result in a brighter light in an area. A faster arm movement will result in dimmer light in an area. The arm does not need to travel at one speed for the entire rotation of the arm. Thus, it is contemplated and disclosed that certain portions of the 360-degree travel arc will have the arm move faster or slower to modify the effect and/or intensity of the light on the product and as received by the camera.

It will become readily apparent to persons having skill in the art that the means for moving the movable display 108 may employ a trackless conveyance system, such as a wheeled, rolling, floating, or flying robot with accurate movement control and its own means of navigation. It is therefore contemplated that any means to move the movable arm and/or the movable display may be used as described herein. In other words, the screen does not need to be mounted on an overhead arm but could be connected to a moving or rotating platform which is moved by any sufficiently precise mechanical means. A computer system 114 can be configured to control such means for moving the movable display.

Figure 3A:
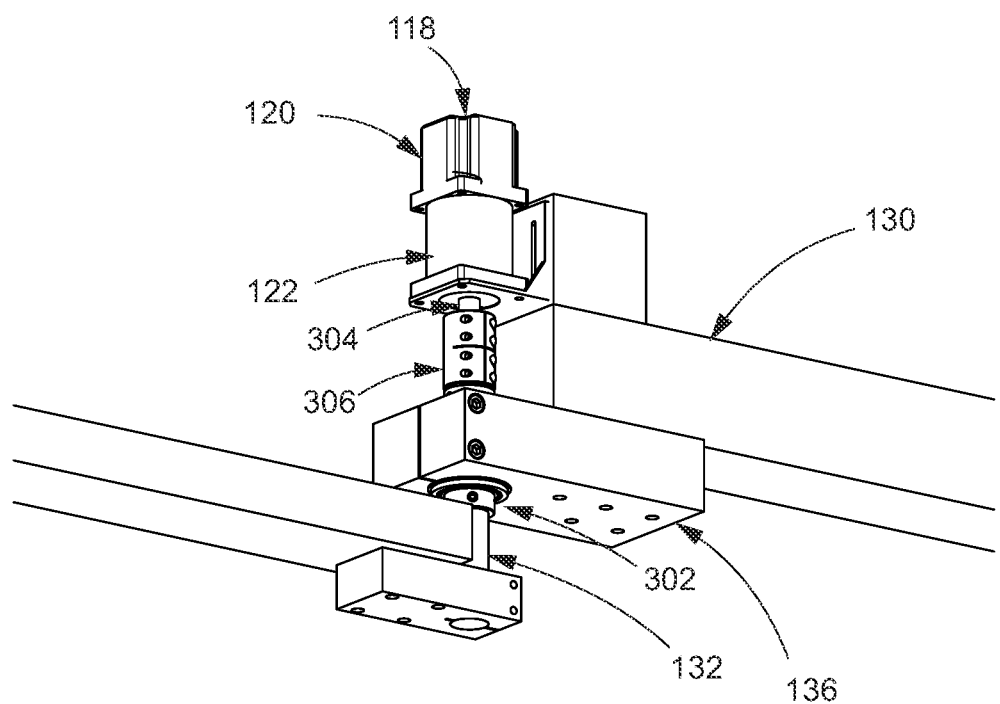
FIG. 3A is a perspective view of an upper axle assembly of the system for product photography in accordance with an embodiment of the invention.

FIG. 3A is a perspective view of an upper axle assembly of the system for product photography in accordance with an embodiment of the invention. In this example embodiment, the movable arm assembly including a movable arm 110 is rotatably connected to the upper axle by a plurality of bearings 302. Motion is imparted to the movable arm 110 and the affixed digital display 108 by means of an electric stepper motor 120 connected to a planetary gearbox 122 with a 50:1 gear ratio. Without the gearbox 122, the stepper motor 120 has a native step angle of 1.8 degrees, or 200 steps per revolution. When connected to the 50:1 planetary gearbox 122, the stepper motor 120 and gearbox 122 have a combined resolution of 10,000 steps per revolution. The stepper motor 120 is controlled through the use of a stepper motor controller 118. It will become readily apparent to persons having skill in the art that the stepper motor controller 118 receives electrical impulses or any other type of control signal from a computer 114 or microcontroller via a cable or via a wireless interface (not illustrated), such that each impulse instructs the stepper motor 120 to take a single step, which in this configuration is 1/10,000 of a revolution. When a series of rapid step impulses are sent from the computer 114 to the stepper motor controller 118, the stepper motor 120 moves the movable arm 110 in what appears to be a smooth fashion, but is actually a number of very small increments or steps. In addition to step impulses, the computer 114 can also send direction impulses, instructing the stepper motor 120 to run in either a clockwise or counter-clockwise direction. The output shaft 304 of the planetary gearbox 122 is connected to the upper axle 132 via an axle coupling 306.

Figure 3B:
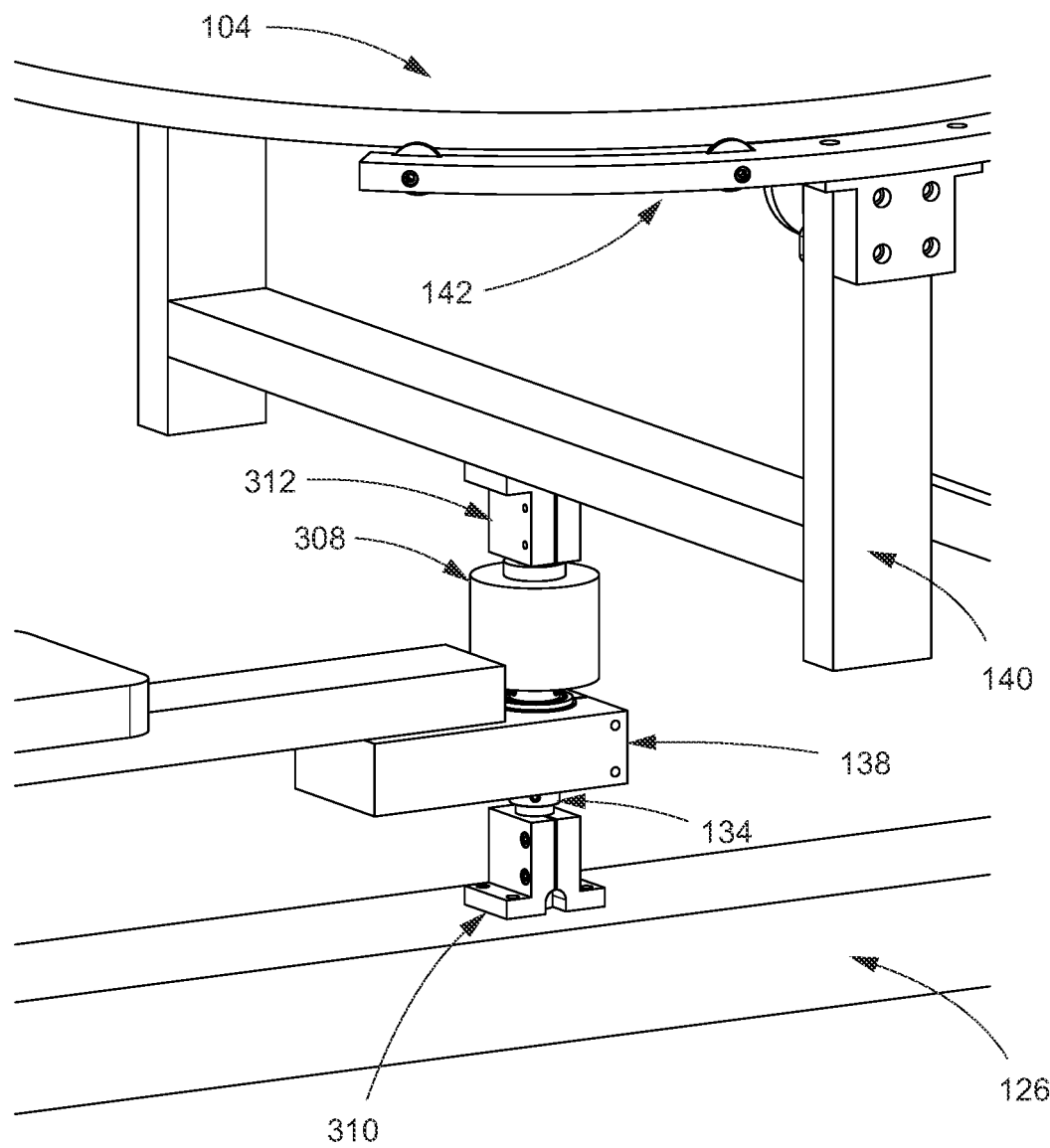
FIG. 3B is a perspective view of a lower axle assembly of the system for product photography in accordance with an embodiment of the invention.

FIG. 3B is a perspective view of a lower axle assembly of the system for product photography in accordance with an embodiment of the invention. In this example embodiment, a rotatable surface 104 measuring approximately 36 inches in diameter by 1 inch in thickness is placed upon two curved arms 142 which are affixed to the tabletop support 140. The curved arms 142 feature a plurality of flanged rollers, thus supporting and holding the rotatable surface 104 in place. The rotatable surface support 140 is affixed to the lower axle 134 via a brace 312. Persons having skill in the art will appreciate that numerous combinations of known parts can be used to create a lower axle assembly if so desired. A slip-ring connector 308 allows for electrical signals and power across a rotating lower axle assembly without wires being twisted or caught around the lower axle 134. Persons having skill in the art will appreciate that numerous slip ring connectors are available for use. A lower brace 310 can be used to connect the lower axle to the H Shaped bottom frame 126. In other embodiments, other methods and arrangements may be adopted for securing the rotatable surface 104 to the support structure, or as pictured, the H shaped bottom frame 126.

Figure 4:
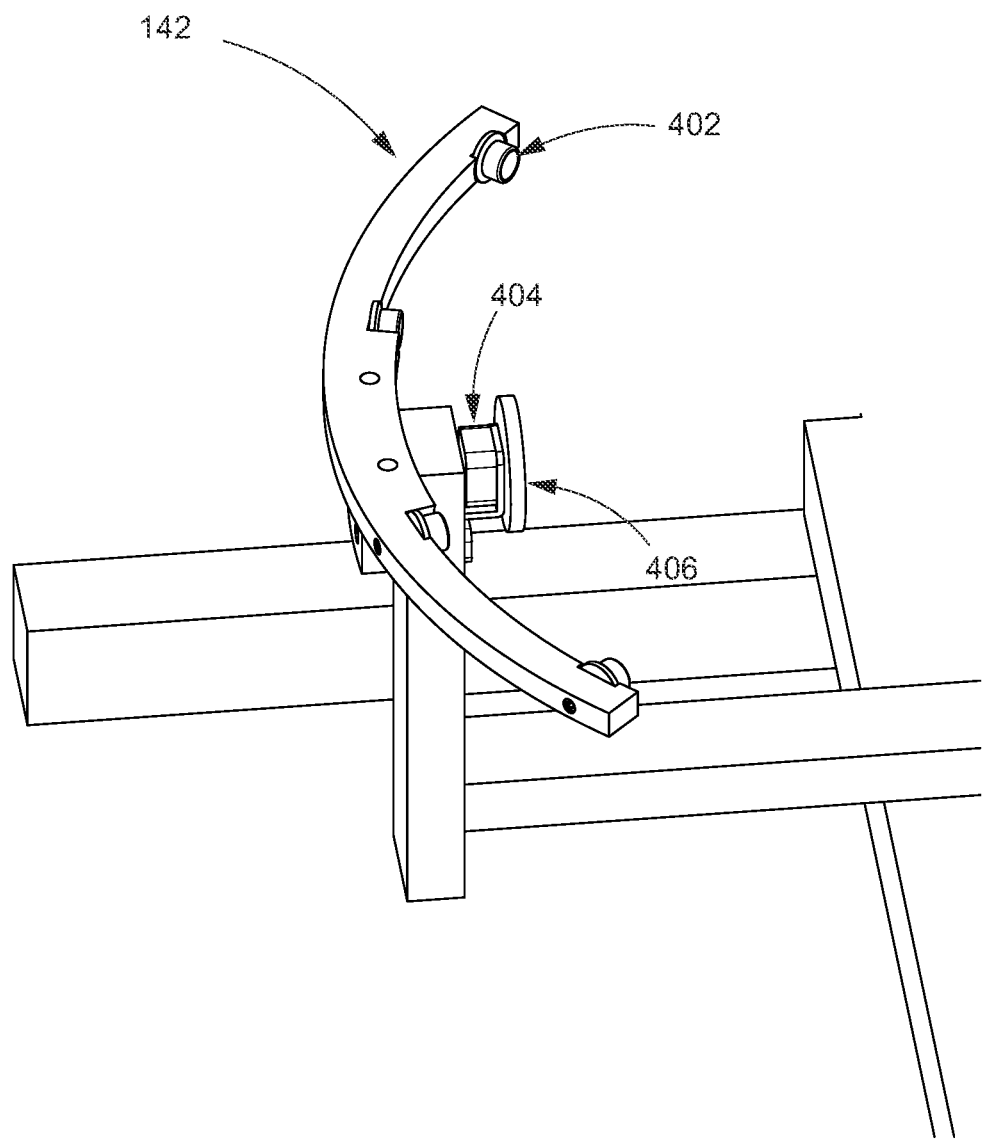
FIG. 4 is a perspective view of a rotatable surface support and curved arm assembly in accordance with an embodiment of the invention.

FIG. 4 is a perspective view of a rotatable surface support and curved arm assembly in accordance with an embodiment of the invention. Each curved arm 142 includes a plurality of rollers 402 which are angled inward towards the center of the curved arm's arc. Notably, the rollers 402 feature a flanged lip, thus supporting and holding the rotatable surface 104 in place. Persons having skill in the art will appreciate that the rollers allow for free rotation of the rotatable surface 104 while providing sufficient support to allow the rotatable surface to movably rest on the rollers. Persons having skill in the art will further appreciate that numerous rollers and bearings are available to use in various embodiments of the invention depending on factors such as weight requirements and size of photographic subjects to be photographed. A motor assembly 404 including a motor and controller are connected to a drive wheel assembly 406. The motor assembly governs the motion of the drive wheel assembly which, in turn, applies a rotation force to the rotatable surface 104. In the preferred embodiment of the invention, the motor is driven by a stepper motor capable of rotating the rotatable surface at measurable increments and at calculable speed. The motor controller can be connected to the computer unit 114 to program the motion of the rotatable surface. The motor assembly 404 receives control instructions from one or more computers 114 to control factors such as the speed and number of increments. In some embodiments, one or more computers 114 are capable of synchronizing movement of the rotatable surface 104 with an image displayed on the screen 112 of the movable display 108.

Figure 5:
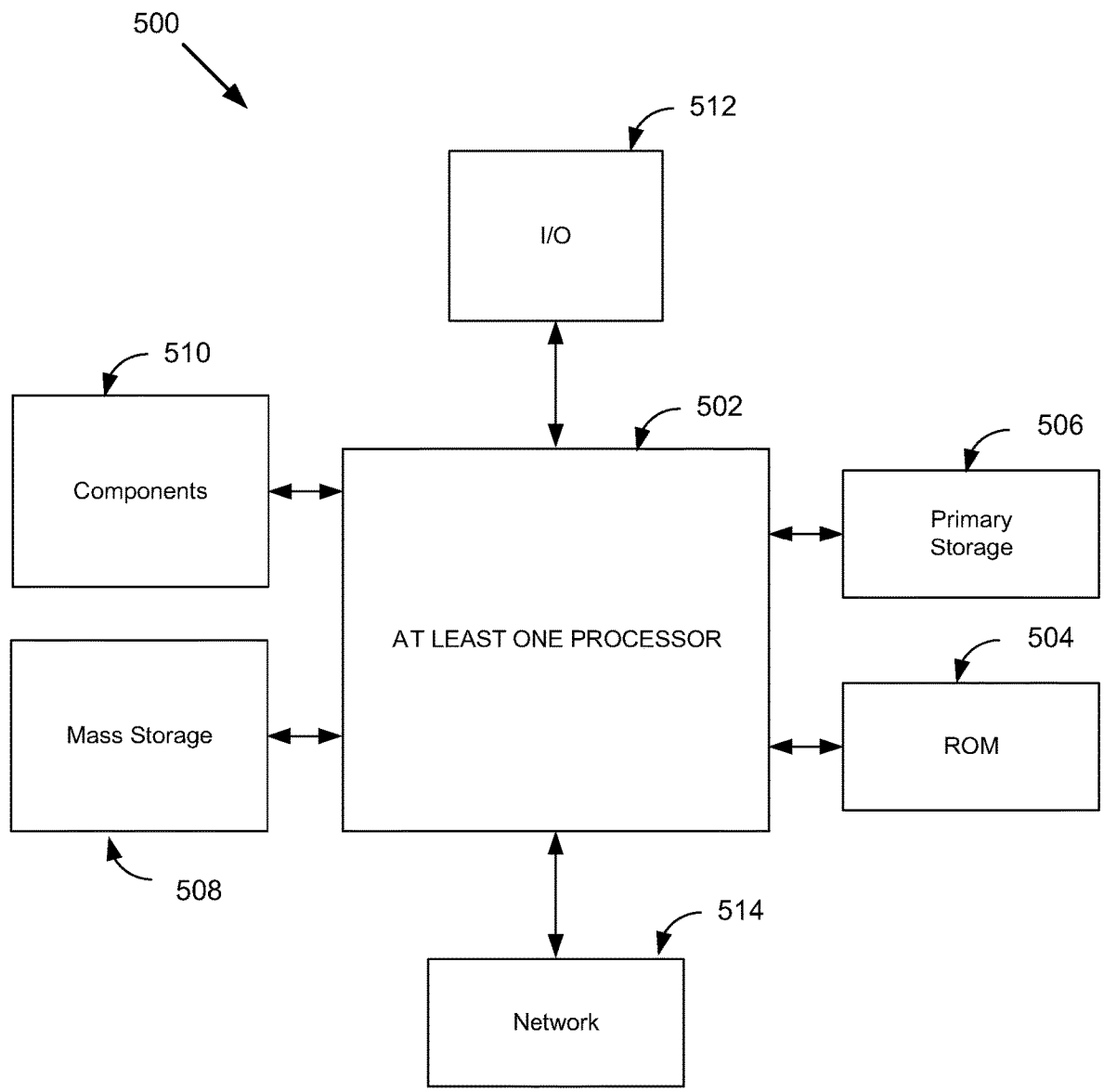
FIG. 5 is a block diagram of a typical computer system that, when appropriately configured or designed, may serve as a computer system for which the controller unit of the system and method for product photography, and the components thereof, may be embodied.

FIG. 5 illustrates a typical computer system that, when appropriately configured or designed, may serve as a computer system for which the computers 114 of the system and method for product photography, and the components thereof, be embodied. The computer system 500 includes at least one processor 502 (also referred to as central processing units, or CPUs) that may be coupled to storage devices including a primary storage 506 (typically a random-access memory, or RAM), a primary storage 504 (typically a read-only memory, or ROM). CPU 502 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors. As is well known in the art, primary storage 504 acts to transfer data and instructions uni-directionally or bi-directionally to the CPU and primary storage 506 typically may be used to transfer data and instructions in a bi-directional manner. The primary storage devices discussed previously may include any suitable computer-readable media known and appreciated in the art. A mass storage device 508 may also be coupled bi-directionally to CPU 502 and provides additional data storage capacity and may include any of the computer-readable media described above. Mass storage device 508 may be used to store programs, data and the like and typically may be used as a secondary storage medium such as a hard disk or a flash drive. It will be appreciated that the information retained within mass storage device 508, may, in appropriate cases, be incorporated in standard fashion as part of primary storage 506 as virtual memory.

The CPU is coupled to the various components 510 of the invention such as the movable display, the movable arm, the rotatable surface and accessory light assembly. The CPU can also be configured to operate the stepper motor components of both the rotatable arm assembly and the rotatable surface. The CPU 502 may also be coupled to an interface 512 that connects to one or more input/output devices such as buttons, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPU 502 optionally may be coupled to an external device such as a database or a computer, tablet, smartphone, or internet network using an external connection shown generally as a network 514, which may be implemented as a hardwired or wireless communications link using suitable conventional technologies. With such a connection, the CPU 502 might receive information from the network, or might output information to the network in the course of performing the method steps described in the teachings of the present invention.

It will be understood by persons having skill in the art that memory storing computer readable instructions that, when executed by the at least one processor, cause the system and method for product photography, by at least one processor, to perform the steps of certain functions such as, but not limited to, beginning capture of the long exposure, using a movable digital display to illuminate one or more photographic subjects, using the digital display to create one or more digital light paintings, moving the display along a path incrementally, synchronizing the movable display to display a segment of the that has moved incrementally opposite in the direction of the movable display, repeating the steps of moving the movable display around or behind the one or more photographic subjects incrementally and synchronizing the said movable display to display a segment of a background image that has moved incrementally opposite in the direction of the said movable display until a desired long exposure image has been captured by the said camera, ending capture of the long exposure, and storing the photographic image in memory.

The invention can be further implemented as machine readable instructions detailing a method for operating a system and method for product photography wherein one or more computers 114 controls functions such as, but not limited to, powering up and starting the system; selecting and loading an image to be displayed on the movable display; beginning capture of the long exposure illuminating the said one or more photographic subjects with the said Movable display; using the said movable display to display a segment of an image; moving the said movable display along a path incrementally; synchronizing the said movable display to display a segment of the said image that has moved incrementally opposite in the direction of the said movable display; repeating the steps of moving the said movable display behind the one or more photographic subjects incrementally and synchronizing the said movable display to create one or more digital light paintings until a desired long exposure image has been captured by the said camera. ending capture of the long exposure; and storing the captured photographic image in memory.

The invention can be further implemented as machine readable instructions detailing a method for operating a system and method for product photography wherein one or more computers 114 controls functions such as, but not limited to, powering up and starting the system; beginning capture of the long exposure; illuminating the said one or more photographic subjects with the said movable display; selecting and loading an image to be displayed on the movable display using the said movable display to display a segment of an image; moving the said movable display along a path incrementally; synchronizing the said movable display to display a segment of the said image that has moved incrementally opposite in the direction of the said movable display; repeating the steps of moving the said movable display behind the one or more photographic subjects incrementally and synchronizing the said movable display to create one or more digital light paintings until a desired long exposure image has been captured by the said camera. ending capture of the long exposure; storing the captured photographic image in memory; and creating animations from the stored image.

Persons having skill in the art will appreciate that the invention can be further implemented as computer readable instructions for performing the aforementioned functions in differing order. Furthermore, it will be understood that a computer can be programmed to perform similar functions or analogous functions depending on the system used based on factors such as, but not limited to, the size of the photographic subject to be photographed. Moreover, it is to be understood that differing digital light paintings can be created using such an invention.

Figure 6:
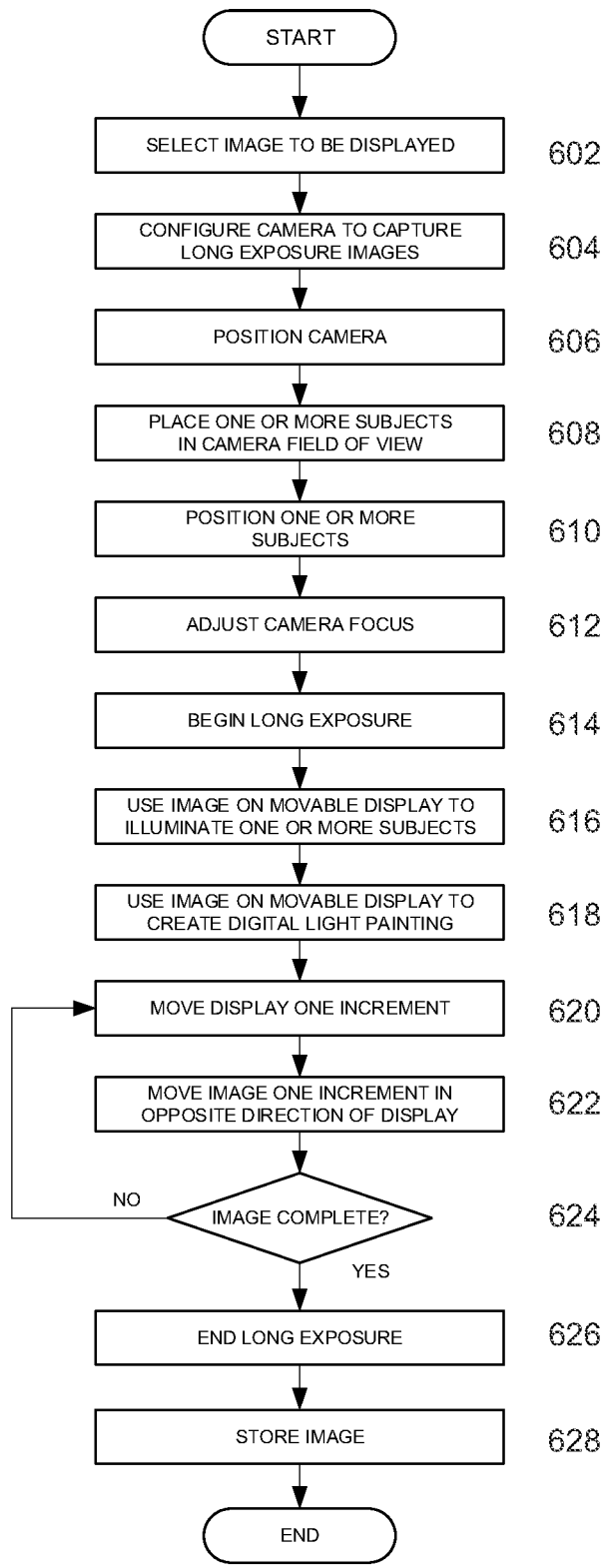
FIG. 6 is a flow diagram of a method for product photography in accordance with an embodiment of the invention.

FIG. 6 is a flow diagram of a method for product photography in accordance with an embodiment of the invention. As a novel standalone method for product photography, the method comprises the steps of a user selecting an image for the digital light painting effect 602. An infinite number of images can be used and selected. The next step involves configuring a camera to capture long exposure images 604. Such a configuration may include, but is not limited to aperture adjustment to allow for optimal light capture and the ISO speed. A configured camera is then positioned to capture images 606. Generally, a camera should be positioned in such a way where a backdrop fully encompasses a camera's field of view. Depending on a photographer's preference, a camera's height and angle can be adjusted. The next step involves placing one or more photographic subjects on a surface configured for placing one or more photographic subjects to be photographed in the camera's field of view 608. The one or more photographic subjects are then positioned in a desirable configuration or arrangement 610. A camera is then focused on one or more photographic subjects in such a manner to capture long exposure images 612. The method then progresses with beginning the capture of a long exposure image 614. Persons having skill in the art will understand that this typically is done by opening the shutter of an SLR or DSLR camera, but other methods of long exposure photography can be used and are to be included in this method. Camera operation can be done manually or by computer control. Such computer controls can be achieved by one or more computers.

The movable display then displays an image on its screen which is then used to illuminate the one or more photographic subjects 616 by displaying any light or color pattern programmed into the computer and to be displayed. The movable display can also be used to display a high-definition image on its screen as it travels along its path. The movable display, as the movable display travels along a path can be used to create one or more digital light paintings at least partially visible to the camera 618. It will be apparent to persons having skill in the art that the image can be a high-definition image capable of creating a number of image effects when moved in relation to the one or more photographic subjects to be photographed. By way of example, and not limitation, embodiments of the invention can readily create and reproduce numerous digital light painting effects. The display is then moved along a path incrementally. In one embodiment of the invention, the movable display is moved one increment 620, typically by a movable arm using a mechanical means such as, but not limited to, a stepper motor. When the movable display is moved one increment, the image on the movable display is moved one increment, that increment being one or more pixels, in the opposite direction 622 as the movable display. This is achieved by synchronizing the movable display to display a segment of the image that has moved incrementally opposite in the direction of the said movable display. The process moving the display incrementally and synchronizing the display to display a segment of an image is repeated and/or continues until the image capture is complete 624. When the image capture is complete, the long exposure capture is ended 626. The captured image is then stored 628 in a computer as a digital image or other medium such as film. Persons having skill in the art will understand that such novel method steps can be implemented as computer readable instructions to operate a system for product photography.

Figure 7:
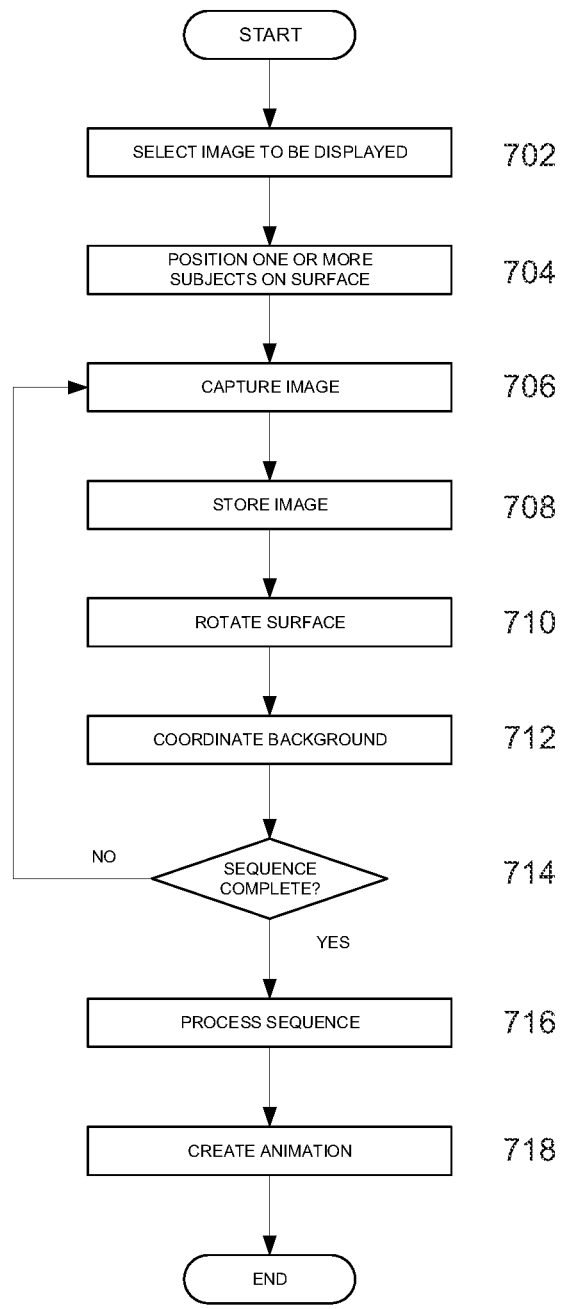
FIG. 7 is a flow diagram of a method for product photography using a system for product photography in accordance with an embodiment of the invention.

FIG. 7 is a flow diagram of a method for product photography using a system for product photography in accordance with an embodiment of the invention. Such a method involves the creation of animated effects using a system for product photography in such a way that objects appear to be moving in a three-dimensional environment having a high-definition image. The method begins by a user selecting an image to be displayed 702 on the movable display to create a digital light painting. positioning one or more photographic subjects on the rotatable surface 704. The method then progresses capturing a long exposure image 706 of a photographic subject using the method steps disclosed in FIG. 6. When each long exposure image is captured, it is stored on a computer 708. The method then proceeds to the step of rotating the surface one increment 710 while the background is coordinated using the computer to move the image in the movable display 712. This method is repeated until the sequence is complete 714 with a plurality of images captured and stored. Once the sequence is complete, the images are processed to remove imperfections or enhance the captured images 716. An animation is then created from the processed images 718.

Figure 8:
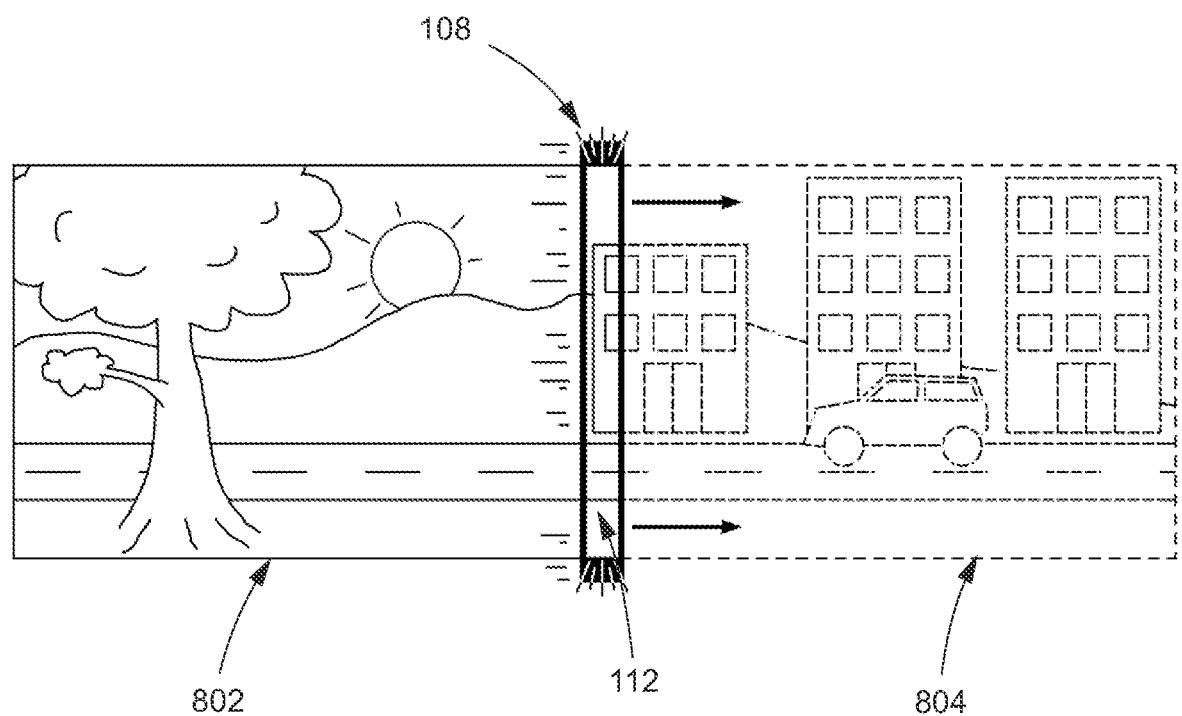
FIG. 8 is a view of the movable display and the digital light painting produced by the system and method for product photography in accordance with an embodiment of the invention.

FIG. 8 is a view of the movable display and the digital light painting produced by the system and method for product photography in accordance with an embodiment of the invention. As previously disclosed, the digital light painting is the result of light emitted by a moving digital display 108 which is visible to a camera while the moving digital display moves along its travel path. In an embodiment of the invention, the distance traveled by the movable display 108, through the use of a mechanical means for moving the display, is equal to the pixel pitch of the screen 112. In embodiments of the invention, computer readable instructions or software on one or more computers sends one or more signals to a motor or other mechanical means instructing it to move one step or increment or measurable distance. After waiting a specified number of milliseconds, the computer will then shift the image on the movable display 108 by one pixel or other incremental distance opposite the direction of travel. The number of milliseconds that the arm stays at one position is selected to properly expose the photograph captured by the camera and may be related to the response rate of the display, or the ISO setting or light sensitivity of the camera. When photographed by a camera using a sufficiently long exposure, the light emitted by the digital display visible to the camera while the digital display moves along its travel path will be recorded by the camera, and any synchronized image shown on the digital display will appear stationary and without significant motion blur when photographed by the camera. Such a digital light painting can be successfully implemented with traditional film cameras or today's digital cameras.

In this view, the movable display 108 is depicted with arrows as traveling from left to right. As earlier disclosed, the movable display 108 includes a screen 112 configured to emit light of any color and any pattern and is configured to receive a display output signal from one or more computers. In an exemplary embodiment of the invention, a portion of a high-definition image is displayed on the screen 112. Persons skilled in the art will appreciate that an infinite number of images, color patterns, light patterns and other effects can be chosen by a user and displayed on the movable display 108. By way of example, and not limitation, the area represented with dashed lines 804 on the right side of the movable display 108 represents a segment of an image that is loaded into memory, but not yet displayed. The central portion represents the movable display 108. The image within the rectangular screen 112 is the portion currently being shown on the movable display 108 as the movable display moves along its travel path. The area on the left side of the drawing 802 shows the area already displayed and exposed on the camera sensor as a digital light painting. Persons having skill in the art will recognize that one or more photographic subjects can be placed in front of such a movable display 108 so as to be photographed with the digital light painting. The resulting image would appear to have a realistic appearing background.

The invention can be used to create still images or animation sequences. When an animation sequence is desired, the steps in FIG. 7 can be followed. When using the invention to create animation sequences, the background image, or digital light painting, can be coordinated with the position of the rotatable surface 104, and by extension, the photographic subject 102 which rests on top of the rotatable surface. By coordinating the background, or digital light painting, to move in sync with the position of the rotatable surface 104, both the background and the photographic subject can appear to be synchronized in relation to one another. The result of this synchronized relationship of the background and the photographic subject is such that with each frame of the animation sequence, the camera will appear to revolve around the photographic subject rather than the photographic subject rotating in front of a stationary camera. For example, if a light painting depicting a 360-degree seamless panorama of a landscape is used, the photographic subject will appear to be located within that virtual environment created by the digital light painting while the camera will appear to revolve around the photographic subject with each frame of the animation. In one example, a series of 72 images are captured using the steps in FIG. 7. The number 72 is used because in this example it is desired to photograph a 360 degree animation of the photographic subject with 5 degrees of rotation between each frame. The rotatable surface is rotated 5 degrees between each image capture. Also, between each image capture, the background image, or digital light painting, is coordinated such that it moves in relation to the rotatable surface. In this example the rotatable surface is rotated clockwise and the background image, or digital light painting, is also shifted clockwise along the travel path of the movable display 108. In this example, the invention is configured as depicted in FIGS. 1-4. The movable display 108 is configured to orbit around a central axis 124 shared by a photographic subject 102. In order for the background, or digital light painting created by the movable display to be properly synchronized with the 5 degree rotation of the rotatable surface 104, the background, or digital light painting, should also rotate around the central axis 124 by 5 degrees between each image capture. To achieve this 5 degree rotation of the background image, the horizontal resolution of the digital light painting being 10,000 pixels wide and spanning the entire circumference of the path of the movable display 108, the image contained within the digital light painting is shifted to the right approximately 139 pixels per image capture, which is approximately 1/72 of 10,000 pixels or 5 degrees. In another embodiment, it is contemplated that the contents of the background, or digital light painting could be a rendered 3D digital environment, such as the type used in video games or film production, instead of a static design or static panoramic photograph. A rendered 3D digital environment would have many advantages, for example, the geometry and projection of the contents of the background, or digital light painting could be matched to the focal length of the lens and the angle and position of the camera 106, and rather than shifting the position of a flat, static background with each exposure, a new background image could be rendered with each exposure, factoring in the new position of the camera relative to the photographic subject and the background, or digital light painting, thereby creating a more realistic and immersive effect.

Having fully described at least one embodiment of the system and method for product photography, other equivalent or alternative methods of implementing such an automated system and method for product photography according to the present invention will be apparent to those skilled in the art. Various aspects of the invention have been described above by way of illustration, and the specific embodiments disclosed are not intended to limit the invention to the particular forms disclosed. The particular implementation of the system and method for product photography may vary depending upon the particular context or application. By way of example, and not limitation, the system and method for the system and method for product photography described in the foregoing was principally directed to the capture of photographic images of relatively small photographic subjects for the purpose of electronic commerce. However, similar techniques may instead be applied to other instances where product photographs are required, which implementations of the present invention are contemplated as within the scope of the present invention. For example, the system and method for product photography could be used for photographic subjects of all sizes. Moreover, methods and techniques from the system and method for product photography can be employed to create high-definition digital light paintings and high-definition animation environments. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Although specific features of the system and method for product photography are shown in some drawings and not others, persons skilled in the art will understand that this is for convenience. Each feature may be combined with any or all of the other features in accordance with the invention. The words "including," "comprising," "having," and "with" as used herein are to be interpreted broadly and comprehensively, and are not limited to any physical interconnection. Claim elements and flowchart steps herein may have been numbered and/or lettered solely as an aid in readability and understanding. Any such numbering and lettering in itself is not intended to and should not be taken to indicate the ordering of elements and/or steps in the claims to be added at a later date.

Any amendment presented during the prosecution of the application for this patent is not a disclaimer of any claim element presented in the description or claims to be filed. Persons skilled in the art cannot reasonably be expected to draft a claim that would literally encompass each and every equivalent.

What is claimed is:

1. A system for product photography comprising:
    a. a movable display containing at least two vertical columns of pixels, said movable display configured to travel along a path, wherein;
        i. the said movable display provides illumination onto at least one photographic subject visible within the field of view of at least one camera configured for long exposure photography; and
        ii. the said movable display, as said movable display travels along said path, creates one or more digital light paintings at least partially visible to at least one camera configured for long exposure photography; and
    b. a mechanical means for movement of the said movable display.

2. The system of claim 1 further comprising a frame configured to provide a stable platform onto which the movable display and mechanical means for movement of the said movable display are mounted.

3. The system of claim 2 further comprising a backdrop assembly, the said backdrop assembly attached to the frame.

4. The system of claim 2 wherein two or more curved arms are attached to the frame, the said two or more curved arms having a plurality of rollers, said rollers configured to support a rotatable surface onto which one or more photographic subjects are placed.

5. The system of claim 1 further comprising a rotatable surface onto which one or more photographic subjects are placed.

6. The system of claim 5 wherein the rotatable surface onto which one or more photographic subjects are placed is driven by at least one motor, said motor configured to rotate the said rotatable surface clockwise or counterclockwise incrementally.

7. The system of claim 1 wherein the movable display is a flat, rectangular shaped color display.

8. The system of claim 1 wherein the movable display is a curved rectangular shaped color display.

9. The system of claim 1 wherein the mechanical means for movement of the movable display is a rotating arm assembly, the said rotating arm assembly consisting of a rotating arm being connected to a frame via at least one axle which permits the movable display to orbit around a central axis.

10. The system of claim 9 wherein the rotating arm assembly is conveyed by at least one stepper motor and a gear system, which rotates the said rotating arm and the movable display around a central axis a fixed number of steps per revolution with a fixed distance between each step.

11. The system of claim 1 wherein the mechanical means for movement of the movable display is a movable conveyor assembly, the said movable conveyor assembly configured to move the said movable display linearly or near linearly in a camera's field of view from one side of the said one or more photographic subjects, behind the said one or more photographic subjects, to the other side of the said one or more photographic subjects in such a manner so as to create a digital light painting when the said movable display is moved behind one or more photographic subjects.

12. The system of claim 1 further comprising at least one processor and memory, said memory including computer executable instructions which, when executed by the said at least one processor, cause the movable display to display a segment of a stored image which is synchronized with the position of the movable display in such a manner that when the movable display travels one increment in one direction, the stored background image displayed on the movable display is moved one increment in the opposite direction in such a manner that the image appears stationary in three dimensional space.

13. The system of claim 1 further comprising at least one processor and memory, said memory including computer executable instructions which, when executed by the said at least one processor, adjust the properties of the image displayed on the movable display.

14. The system of claim 1 further comprising at least one processor and memory, said memory including computer executable instructions which, when executed by the said at least one processor, adjust the position of the movable display.

15. The system of claim 1 further comprising one or more accessory lights, the said one or more accessory lights mounted such that they move in conjunction with the movable display and are configured to direct light towards the one or more photographic subjects as the movable display moves along a travel path.

16. The system of claim 15 further comprising at least one processor and memory, said memory including computer executable instructions which, when executed by the said at least one processor, controls the position, timing, duration, color and intensity of the one or more accessory lights in such a manner so as to illuminate one or more photographic subjects along any point of the travel path of the said one or more accessory lights.

17. The system of claim 1 wherein the mechanical means for movement of the movable display is configured in such a way so as to revolve the said movable display around a central axis.

18. The system of claim 1 wherein a camera configured for long exposure photography remains stationary within the field of view of a photographic subject.

19. The system of claim 1 wherein the horizontal resolution of the digital light painting is equal to the pixel pitch of the movable display.

20. The system of claim 1 wherein the pixel pitch of the movable display is sufficiently small such that the space between each pixel of said movable display is not resolvable by a camera configured for long exposure photography when said camera configured for long exposure photography is focused on one or more photographic subjects.

21. A method of capturing a photographic image using a system comprising at least one camera configured to capture long exposure images of one or more photographic subjects; at least one processor; memory; a surface onto which one or more photographic subjects are placed; a movable display containing at least two vertical columns of pixels configured to travel along a path, wherein the said movable display provides illumination onto one or more photographic subjects visible within the field of view of at least one camera configured for long exposure photography, and the said movable display, as said movable display travels along said path, creates one or more digital light paintings visible to the said at least one camera configured to capture long exposure images of one or more photographic subjects; and a mechanical means for movement of the said movable display, the method comprising the steps of:

a. selecting an image to be displayed on the said movable display containing at least two vertical columns of pixels;

b. placing one or more photographic subjects on the said surface onto which one or more photographic subjects are placed;

c. positioning the said camera configured to capture long exposure images for capturing a long exposure image;

d. adjusting the said camera configured to capture long exposure images of one or more photographic subjects to bring the said one or more photographic subjects on the said surface on which one or more photographic subjects are placed into focus;

e. beginning capture of the long exposure;

f. using the said movable display containing at least two vertical columns of pixels to provide illumination onto said one or more photographic subjects visible within the field of view of said camera.

g. using the said movable display containing at least two vertical columns of pixels, as said movable display travels along said path, to create one or more digital light paintings at least partially visible to said camera.

h. ending capture of the long exposure; and i. storing the captured photographic image in memory.

22. The method of claim 21 wherein the mechanical means for movement of the movable display containing at least two vertical columns of pixels is configured in such a way so as to revolve the said movable display around a central axis.

23. The method of claim 21 wherein the movable display contains at least two vertical columns of pixels.

24. The method of claim 21 wherein the camera configured for long exposure photography remains stationary.

25. The method of claim 21 wherein the horizontal resolution of the digital light painting is equal to the pixel pitch of the movable display.

26. The method of claim 21 wherein the pixel pitch of the movable display containing at least two vertical columns of pixels is sufficiently small such that the space between each pixel of said movable display is not resolvable by a camera configured for long exposure photography when said camera configured for long exposure photography is focused on one or more photographic subjects.

27. The method of claim 21 further comprising the step of incrementally rotating the surface onto which one or more photographic subjects are placed to capture a photographic image of a one or more photographic subjects at a different angle and adjusting the image displayed on the movable display containing at least two vertical columns of pixels relative to the rotation of the said surface on which one or more photographic subjects are placed.

28. A method of capturing a photographic image of one or more photographic subjects, the method comprising the steps of:
   a. selecting an image to be displayed on a movable display containing at least two vertical columns of pixels;
   b. configuring at least one or more cameras to capture long exposure images of one or more photographic subjects;
   c. placing one or more photographic subjects onto a surface configured for placing one or more photographic subjects to be photographed;
   d. positioning one or more cameras configured to capture long exposure images of one or more photographic subjects such that the said one or more photographic subjects are within the field of view of said one or more cameras;
   e. focusing the said one or more cameras configured to capture long exposure images of one or more photographic subjects;
   f. beginning capture of the long exposure;
   g. using a movable display containing at least two vertical columns of pixels to illuminate the said one or more photographic subjects;
   h. moving said movable display containing at least two vertical columns of pixels along a path while using the said movable display to create one or more digital light paintings at least partially visible within the field of view of the said one or more cameras;
   i. ending capture of the long exposure; and
   j. storing the photographic image in memory.

29. The method of claim 28 further comprising the step of creating animation with one or more images stored in memory, said one or more images captured using the steps of claim 28.

* * * * *